United States Patent [19]

Dessau

[11] Patent Number: 4,892,645

[45] Date of Patent: Jan. 9, 1990

[54] DEWAXING CATALYST BASED ON TIN CONTAINING MATERIALS

[75] Inventor: Ralph M. Dessau, Edison, N.J.

[73] Assignee: Mobil Oil Corporation, New York, N.Y.

[21] Appl. No.: 211,205

[22] Filed: Jun. 24, 1988

[51] Int. Cl.$^4$ .................... C10B 47/02; C10B 11/02

[52] U.S. Cl. .................... 208/111; 208/122; 208/124

[58] Field of Search .................... 208/111, 122, 124

[56] References Cited

U.S. PATENT DOCUMENTS

| | | | |
|---|---|---|---|
| Re. 29,948 | 3/1979 | Dwyer et al. | 208/110 |
| 3,702,293 | 11/1972 | Hayes et al. | 208/139 |
| 3,702,294 | 11/1972 | Rausch | 208/139 |
| 3,878,131 | 4/1973 | Hayes | 252/466 PT |
| 4,104,320 | 8/1978 | Bernard et al. | 260/673.5 |
| 4,325,808 | 4/1982 | Kim et al. | 208/65 |
| 4,347,394 | 8/1982 | Detz et al. | 585/419 |
| 4,387,258 | 6/1983 | Vadekar et al. | 585/259 |
| 4,416,806 | 11/1983 | Bernard et al. | 502/74 |
| 4,418,006 | 11/1983 | Kim et al. | 502/73 |
| 4,435,283 | 3/1984 | Buss et al. | 208/138 |
| 4,456,527 | 6/1984 | Buss et al. | 208/89 |
| 4,486,547 | 12/1984 | Imai et al. | 502/223 |
| 4,487,843 | 12/1984 | Telford et al. | 502/85 |
| 4,487,848 | 12/1984 | Robinson et al. | 502/223 |
| 4,547,472 | 10/1985 | Nordstrand | 502/66 |
| 4,576,805 | 3/1986 | Chang et al. | 423/277 |
| 4,588,495 | 5/1986 | Franck et al. | 208/65 |
| 4,604,371 | 8/1986 | Moorehead | 502/60 |
| 4,614,834 | 9/1986 | Lamber et al. | 585/419 |
| 4,619,906 | 10/1986 | Lambert et al. | 502/66 |
| 4,776,946 | 10/1988 | Moorehead | 208/111 |

FOREIGN PATENT DOCUMENTS

| | | |
|---|---|---|
| 0107389 | 4/1984 | European Pat. Off. |
| 2033358 | 5/1980 | United Kingdom . |
| 2114150 | 8/1983 | United Kingdom . |

OTHER PUBLICATIONS

G. Wengui et al. "IR Study of Framework Vibrations and Surface Properties High Silica Zeolites", Zeolites, Elsevir Science, Amsterdam, 1985, p. 279 Ione, Journal of Molecular Catalysis, 31, p. 355-370 (1985).

Ione, Elsevir Science, (1984), pp. 151-155.

*Primary Examiner*—Cirtis R. Davis
*Attorney, Agent, or Firm*—Alexander J. McKillop; Charles J. Speciale; Marina V. Schneller

[57] ABSTRACT

Catalytic dewaxing of wax containing hydrocarbon feedstocks is undertaken in the presence of a catalyst composition comprising a dehydrogenation metal in combination with a non-acidic microporous crystalline material containing tin to maximize liquid yield.

29 Claims, No Drawings

DEWAXING CATALYST BASED ON TIN CONTAINING MATERIALS

FIELD OF THE INVENTION

The invention pertains to catalytic dewaxing of waxy feedstocks by a catalytic composition comprising a dehydrogenation metal, such as platinum, in combination with a non-acidic crystalline microporous material containing a modifier selected from the group consisting of tin, thallium and lead. Liquid yields of product are maximized by substantially reducing cracking of the wax components during dewaxing. The dewaxed product has a pour point less than that of the feed.

BACKGROUND OF THE INVENTION

The art recognizes several methods for eliminating the waxy component(s) of waxy feeds, generally referred to as dewaxing. Solvent refining was, and is still currently, a method by which wax is removed from waxy feedstocks. The use of solvent is both cumbersome and expensive, because of the volume to feed to be processed, and the inherent expense of solvent.

Catalyst cracking and hydrocracking treatments may be used to reduce the wax content of feedstocks. The wax content of feedstocks is attributable to long chain unbranched and slightly branched aliphatics. Accordingly, catalytic cracking (and hydrocracking) of the wax components reduce the liquid volume of product vis-a-vis that of the feed. Moreover, alteration of other components of the feed occurs.

The problems which inhere in those dewaxing processes are in large part due to the complexity of the molecular constitution of the feeds. Accordingly, empirical considerations control dewaxing processing techniques.

SUMMARY OF THE INVENTION

By employing a non-acidic catalyst in dewaxing, substantial reduction and/or elimination of products of cracking and hydrocracking are realized. Accordingly, compared to catalytic dewaxing in the presence of acidic catalysts, liquid yields are increased. Off-gas, biproduct(s) of cracking (and hydrocracking) are also substantially reduced and/or eliminated.

By employing the catalyst of the dewaxing process of the invention, the nature of the products resulting from conversion of the wax components is predictable. In accordance with the invention, the wax components are converted to distillate range products. Under catalyst dewaxing conditions, the contact of a wax containing feedstock with a catalyst comprising a dehydrogenation metal and a non-acidic crystalline microporous material containing a tin, thallium or lead modifier, achieves the foregoing results.

DETAILED DESCRIPTION OF THE INVENTION

In accordance with the invention, wax content of waxy feedstocks is decreased, under dewaxing conditions, by contact with a catalyst comprising a dehydrogenation/hydrogenation metal and a non-acidic, microporous crystalline material containing a tin, thallium or lead modifier. In this catalytic process the wax components of the waxy feed stock are converted to distillate boiling range products, the pour point of the feed is reduced; and liquid yields, are maximized with low, if any, gas production.

Feeds

Waxy hydrocarbon oils boiling within the range of about 350° to 1025° F. may be treated in accordance with the invention. Gas oils, kerosenes, vacuum gas oils, whole crudes and oils derived from tar sands, shale and coal are contemplated for use herein.

The term "waxy", as used herein will refer to an oil of sufficient wax content to result in a pour point greater than 0° F., and preferably greater than +30° F. Components of the feed which render the feed waxy include straight chain normal or slightly branched paraffins. This process of the invention converts the waxy long chain paraffins into materials which are compatible with the oil product, e.g., fuel oil product, permitting increased yields of oil. Normal-paraffins in the feeds can be converted into alkyl aromatics. By way of illustration, n-decane was converted to n-butylbenzene. From a liquid yield standpoint, it is much more beneficial, to convert long chain paraffins to other liquid products than it is to simply crack or hydrocrack to light gases.

In accordance with the invention, the $C_{15}+$ long chain normal to slightly branched chain aliphatics are converted to distillate range products, and thus the resultant product has a reduced pour point, as well as a reduced wax content.

Prior to dewaxing, the feeds may have been hydrotreated. Initial hydrotreating of a hydrocarbon feed serves to convert sulfur, nitrogen and oxygen derivatives of hydrocarbons to hydrogen sulfide, ammonia and water while depositing metal contaminant from hydrodecomposition of any organo-metal compounds. Where desired, interstage processing of the effluent from the hydrotreating zone may be effected. Such interstage processing may be undertaken, for example, to provide additional hydrogen, to add or remove heat or to withdraw a portion of the hydrotreated stream. Hydrotreating may be essential. Suitably, the temperature in the hydrotreating catalyst bed will be within the approximate range of 550° F. to 850° F. The feed is conducted through the bed at an overall space velocity between about 0.1 and about 10 and preferably between about 0.2 and about 2, with hydrogen initially present in the hydrotreating zone in an amount between about 1000 and 10,000 standard cubic feet per barrel of feed, corresponding to a ratio of between about 2.4 and about 24 moles of hydrogen per mole of hydrocarbon (feed).

The catalyst may be of any of the known hydrotreating catalysts, many of which are available as staple articles of commerce. These hydrotreating catalysts are generally metals or metal oxides of Group VIA and/or Group VIII deposited on a solid porous support, such as silica and/or metal oxides such as aluminas, titania, zirconia or mixtures thereof. Representative Group VIA metals include molybdenum, chromium and tungsten and Group VIII metals include nickel, cobalt, palladium and platinum. These metal components are deposited, in the form of metals or metal oxides, on the indicated supports in amounts generally between about 0.1 and about 20 weight percent.

Dewaxing Conditions

In accordance with the invention, the waxy feedstock is contacted under dewaxing conditions with a catalyst composition comprising a dehydrogenation/hydrogenation metal and an tin containing non-acidic crystalline microporous material.

The dewaxing conditions are tabulated below:

| Dewaxing Conditions | |
|---|---|
| Pressure, broad, (psig) | 0–1000 |
| Pressure, preferred (psig) | 20–500 |
| Temperature, broad (°F.) | 500–1200 |
| Temperature, preferred (°F.) | 800–1050 |
| WHSV* | 0.1–20 |
| WHSV, preferred | 0.2–10 |
| $H_2$:oil | 0–20:1 |

*WHSV = weight hourly space velocity, weight of feed per unit weight of catalyst per hour.

The Dewaxing Catalyst

The dewaxing catalyst comprises a dehydrogenation/hydrogenation metal and a non-acidic crystalline microporous material containing tin, thallium or lead.

The amount of dehydrogenation/hydrogenation metal in the catalyst can range from 0.01 to 30 weight percent and practically from 0.1 to 10 weight percent. The dehydrogenation/hydrogenation metal can be any Group VIII metal, chromium or vanadium; preferably, it is a platinum group metal and most preferably it is platinum.

The tin, thallium or lead modifier content of the crystalline materials can range from 0.01 to 20 weight percent. Practically, the tin content will range from 0.1 to 10 weight percent.

The crystalline microporous materials of the invention are characterized by Si/Al ratios of at least 2. However, the silica:alumina ratio of the zeolite can be up to 1000, or greater. In a preferred embodiment the aluminum content of these materials is less than 0.1 weight percent and more preferably less than 0.02 weight percent.

The crystalline microporous material of the invention can contain other elements including boron, iron, chromium and gallium. The content of these other elements in the crystalline tin containing silicates can range from 0 to 10 weight percent.

The crystalline materials of the invention, described herein, are crystalline in the sense that they are identifiable as isostructural with zeolites by X-ray powder diffraction pattern.

The crystalline microporous modifier containing material has an X-ray diffration pattern which corresponds to a zeolite, SAPO, ALPO, etc.

In a preferred embodiment the pore size of the microporous crystalline modifier containing silicates ranges from about 5 to about 8 Angstroms and freely sorb normal hexane. The preferred class of crystalline microporous silicates is that class having crystalline structure isostructural with zeolites which the acid form exhibit a constraint index of 1 to 12, which is a convenient measure of the extent to which a zeolite provides control to molecules of varying sizes to its internal structure. Zeolites which provide a highly restricted access to and egress from its internal structure have a high value for the Constraint Index, and zeolites of this kind usually have pores of small size, e.g. less than 5 Angstroms. On the other hand, zeolites which provide relatively free access to the internal zeolite structure have a low value for the Constraint Index, and usually pores of large size, e.g. greater than 8 Angstroms. The method by which Constraint Index is determined is described fully in U.S. Pat. No. 4,016,218, incorporated herein by reference for details of the method.

Constraint Index (CI) values for some typical materials are:

| | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the the test method within the range of 290° C. to about 538° C., with accompanying conversion between 10% and 60%, The CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12. In a preferred embodiment the microporous crystalline material containing modifier exhibits the structure of ZSM-5, by X-ray diffraction pattern. The X-ray diffraction pattern of ZSM-5 has been described in U.S. Pat. No. 3,702,886 and RE 29,948 each of which is incorporated by reference herein.

The compositions comprising hydrogenation/dehydrogenation metal combined with the crystalline modifier containing silicates do not exhibit any appreciable acid activity. These catalysts would meet the criteria of non-acidic catalysts described by Davis and Venuto, J. CATAL. Vol. 15, p. 363 (1969). Thus, a non-equilibrium mixture of xylenes are formed from either n-octane or each individual methylheptane isomer, with the octane yielding more o-xylene and 2-methyl-heptane yielding mostly m-xylene, at conversions between 10 and 60%.

When, as in embodiments herein, the crystalline modifier dehydrogenation metal containing material exhibits an X-ray diffraction pattern of a zeolite, at least some of the dehydrogenation metal may be intrazeolitic, that is, some of the metal is within the pore structure of the crystal, although some of that metal can be on the surface of the crystal. A test for determining whether, for example, Pt is intrazeolitic or extrazeolitic in the case of ZSM-5 is reported by R. M. Dessau, J. CATAL. Vol. 89, p. 520 (1984). The test is based on the selective hydrogenation of olefins.

One way of incorporating modifier into the composition of this invention is by incorporating during the synthesis of the non-acidic crystalline microprous material. Alternatively, modifier can be incorporated with the crystalline composition post-synthesis of the microproous crystalline material. The dehydrogenating metal can be incorporated during or after synthesis of the microporous crystalline material. The dehydrogenating metal can be incorporated before, simultaneously with or after modifier incorporation.

Alternatively, reverse procedures can be applied in which the dehydrogenation function is further introduced with subsequent tin incorporation. Stepwise preparation includes techniques of cocrystallization, impregnation, or exchange. Cocrystallization can be undertaken in a two phase system described in commonly assigned Ser. No. 878,555, filed June 26, 1986. Other elements such as boron, iron chromium, gallium, can also be included. Simultaneous incorporation includes the combination of tin with the dehydrogenation/hydrogenation function during synthesis (i.e., crystallization) or simultaneously after synthesis of the crystalline material.

A modifier-free material can be treated with tin, thallium or lead compounds at elevated temperatures. Such treatments can be conducted so that the source of modifier is either in the gaseous or the liquid phase including the aqueous phase (such as tin II). Alteratively, a modifier free crystalline reactant can simply be impregnated with tin source and then calcined at temperatures above 400° C.

The modifier free reactant can have high silica:alumina ratios or contain other elements such as boron, chromium, iron, and gallium. Reactants and products containing 0.1 weight percent or less aluminum are the preferred embodiments of the examples. In materials of the invention, all cation-exchangeable sites are occupied by non-hydrogen (non-proton) and by non-hydrogen precursors, such as $NH_4^+$. Specifically, such sites are occupied by $Na^+$, $K^+$, $Cs^+$ or admixtures thereof. The alkali metals serve to neutralize any acidity due to framework aluminum. The source of alkali metal cation can derive from cations incorporated during synthesis, in excess of the aluminum content thereof. Alternatively, one can treat the final product with a basic solution of an alkali metal hydroxide as a final step prior to use, as described for example in U.S. Pat. No. 4,652,360.

In a preferred embodiment, the non-acidic crystalline microporous modifier containing silicates of the invention are treated with $Pt(NH_3)_4Cl_2$ in aqueous solution which has a pH of at least about 7 to incorporate the necessary platinum for catalyst composition formulation.

The non-acidic, crystalline, microporous, modifier and dehydrogenation metal containing materials of the invention can be combined with a matrix or binder material to render them attrition resistant and more resistant to the severity of the conditions to which may will be exposed during use in hydrocarbon conversion applications. The combined compositions can contain 1 to 99 weight percent of the materials of the invention based on the combined weight of the matrix (binder) and material of the invention. When used in dehydrogenation and/or dehydrocyclization, the material of the invention will preferably be combined with non-acidic matrix or binder materials. A preferred matrix or binder material would be silica.

EXAMPLES

Example 1

Tin ZSM-5 silicate was synthesized in a static system at 300° F. 400 g 28.5% sodium silicate (Q-brand) was added to a solution of 60 g 50% tetramethylammonium chloride, 15 g $SnCl_4.5H_2O$, 30 g 98% $H_2SO_4$, and 60 g $TPA+Br-$ in 2250 g water. The mixture was stirred and then placed in a polypropylene bottle in an autoclave for 5 days. The product was 85% crystalline ZSM-5 and consisted of large 5–10 micron crystals. In this and following preparations the zeolitic silicates produced were characterized as having at least one crystal dimension which was at least 0.5 microns; it analyzed for 80.4% $SiO_2$, 0.30% $Al_2O_3$, 3.78% Sn, 2.00% Na, 7.70% C, and 1.05% N.

Example 2

Another tin containing ZSM-5 sample was synthesized by dissolving 0.69 g Sn(II)SO$_4$ in 170 g de-ionized water and then adding 3.39 g NaOH. To this was added 6.38 g tetrapropylammonium bromide. The mixture was transferred to a 300 ml stainless steel autoclave and 16.0 g of a low aluminum content silica gel (SPEX Ind.) was added with stirring. The hydrogel formed by this reaction mixture is described by the following mole ratios:

| $SiO_2/Sn$ | $H_2O/Sn$ | $OH-/SiO_2$ | $Na+/SiO_2$ | $TPA+/SiO_2$ |
| --- | --- | --- | --- | --- |
| 75 | 40 | 0.30 | 0.35 | 0.10 |

The hydrogen was reacted at 160° C. for 5 days with stirring (400 rpm) before quenching. The resulting crystalline product was processed in the usual manner by filtering, washing, and drying. X-ray diffration analysis of the product zeolite showed it to be 100% crystalline ZSM-5. SEM indicated an average crystal size greater than 2 microns.

Example 3

A tin containing ZSM-5 sample was synthesized in a similar mmanner except that the $SiO_2/Sn$ ratio was 150 and the Na+/SiO$_2$ was 0.31. The crystalline ZSM-5 product contained 1.36% Sn, 0.0025% Al, 0.93% Na, and 89.31% Ash.

Example 4

A tin containing ZSM-5 sample was synthesized in a similar manner except that the SiO$_2$/Sn ratio was 50, the Na+/SiO$_2$ was 0.38, and the synthesis time was 4 days.

Example 5

A tin containing ZSM-5 sample was synthesized at a SiO$_2$/Sn ratio of 38, a Na+/SiO$_2$ ratio of 0.40, and a synthesis time of 3 days.

Tin incorporation was achieved during the zeolite synthesis, i.e., tin salts were added directly to the high silica ZSM-5 synthesis mixture. SEM data suggests that a significant portion of the tin is located outside of the large crystals formed (FIG. 1). Nevertheless, some tin must be inside the ZSM-5 crystals, since it modifies the selectivity of the platinum, which itself is intracrystalline.

Platinum was incorporated by ion-exchange of the calcined zeolites, probably, via exchange for sodium ions associated with internal silyloxy groups. The presence of intracrystalline (intrazeolitic) platinum was confirmed by the extremely low benzene hydrogenation rates (TON=4 min$^{-1}$ at 100° C.) measured for these catalysts.

Example 6

Platinum incorporation into the silicates of Examples 1–5 was undertaken. The as-synthesized tin silicates were calcined first in nitrogen and then in air at 520° C. The calcined materials were ion-exchanged with aqueous Pt(NH$_3$)$_4$Cl$_2$ at room temperature; typically, 15–20 mg per gram silicate was used in a non-acidic aqueous medium. The platinum tetramine-containing silicates were then calcined in oxygen to 350° C. at 0.5 C./min.

Elemental analysis of the tin silicate of Example 3 after platinum incorporation indicated Pt=0.80%, Sn=1.54%, Al=31 ppm.

Elemental analysis of the tin silicate of Example 1 after platinum incorporation, Pt=0.65%, Sn=3.50%, Al=0.093%.

Example 7

Thallium ZSM-5 silicate synthesis was undertaken as follows: A solution was prepared by dissolving 0.85 g TlNO$_3$ in 170.6 g di-ionized water and then by adding 2.05 g NaOH pellets. After all the base had dissolved, 6.38 g tetrapropylammonium bromide (TPABr) was added. The resulting solution was transferred to a 300 ml stainless steel autoclave and 16.0 g of silica gel (SPEX Ind.) was stirred into the solution. The hydrogen produced can be described by the following mole ratios:

| SiO$_2$/Tl$_2$O | H$_2$O/SiO$_2$ | OH−/SiO$_2$ | Na+/SiO$_2$ | TPA+/SiO$_2$ |
|---|---|---|---|---|
| 750 | 40 | 0.20 | 0.21 | 0.20 |

The hydrogel was heated in the autoclave for 4 days at 160° C., with stirring at 400 rpm. The product was filtered, washed and dried. X-ray diffraction analysis indicated it to be 100% crystalline ZSM-5.

Elemental analysis indicated the presence of 8.26% C, 1.88% H, 0.74% N, 0.34% Na, 4.33% Tl, 80.65% SiO$_2$, and 0.0095% Al in the ZSM-5 product.

Example 8

Catalyst preparation was undertaken as follows: The as-synthesized thallium silicate was calcined, first in nitrogen and then in air, at 520° C. The calcined zeolite contained 2.43% Tl, 38 ppm Al, and 43.15% Si.

Platinum was incorporated by ion exchange with Pt(NH$_3$)$_4$Cl$_2$ (15 mg/g zeolite) at room temperature. TGA ammonia titration in hydrogen indicated the presence of 0.67% Pt. The platinum-containing zeolite was then calcined in oxygen to 350° C. where it was maintained for one hour at 0.5° C./min.

Example 9

The "non-acidic" nature of the catalyst of Example 8 was confirmed by its ability to aromatize n-heptane to toluene in high yield. At 538° C. and 30 torr heptane in nitrogen, toluene was formed in 83–88% selectivity at a conversion of 99+%. Total yield of benzene plus toluene was greater than 90%.

Example 10

Lead-containing ZSM-5 was synthesized. A solution A was prepared by dissolving 3.31 g Pb(NO$_3$)$_2$ in 338.8 g de-ionized water. A solution B was prepared by dissolving 12.4 g NaOH in 300 g de-ionized water. 23.94 g TPA bromide was then dissolved in solution B, which was then poured into solution A. 60.0 g silica gel (SPEX Ind.) was placed in a 1-liter stainless steel autoclave. The solution was not transferred to the autoclave, and the mixture was stirred for two minutes before sealing the autoclave. Stirring and heating were begun immediately. The composition of the hydrogel formed is described by the following mole ratios:

| SiO$_2$/Pb | H$_2$O/SiO$_2$ | OH−/SiO$_2$ | Na+/SiO$_2$ | TPA+/SiO$_2$ |
|---|---|---|---|---|
| 90 | 40 | 0.30 | 0.34 | 0.10 |

The zeolite crystallization was carried out at 160° C., with stirring at 400 rpm for 4 days. The product ZSM-5 analyzed for 7.96% C, 0.7%, N, 0.97% Na, 4.0% Pb, 86.48% ash, and 235 ppm Al$_2$O$_3$. Platinum incorporation was similar to that in Example 8.

Examples 11–18

The preparation of the borosilicate ZSM-5 has been described. High silica:alumina ZSM-5 samples containing the elements: chromium, titanium, scandium, nickel, gold, germanium, and zirconium were synthesized in a manner analogous to that used to prepare Tl-ZSM-5, described above. The synthesis conditions are show in in Table 1 below:

TABLE 1

| | | Synthesis of Metal-Containing ZSM-5 | | | | | |
|---|---|---|---|---|---|---|---|
| | Metal | Mixture Composition (Mole Ratio) | | | | | |
| Example No. | (M) Salt | SiO$_2$/ M | H$_2$O/ SiO$_2$ | OH−/ SiO$_2$ | Na+/ SiO$_2$ | TPA+/ SiO$_2$ | Time Days |
| 5 | Pb(NO$_3$)$_2$ | 90 | 40 | 0.30 | 0.34 | 0.10 | 4 |

TABLE 1-continued

| | | Synthesis of Metal-Containing ZSM-5 | | | | | |
|---|---|---|---|---|---|---|---|
| | Metal | Mixture Composition (Mole Ratio) | | | | | |
| Example No. | (M) Salt | $SiO_2/M$ | $H_2O/SiO_2$ | $OH^-/SiO_2$ | $Na^+/SiO_2$ | $TPA^+/SiO_2$ | Time Days |
| 6 | $CrCl_3 \cdot 6H_2O$ | 75 | 40 | 0.30 | 0.35 | 0.10 | 3 |
| 7 | $TiCl_4$ | 150 | 40 | 0.30 | 0.33 | 0.10 | 5 |
| 8 | $Sc(NO_3)_3 \cdot 4H_2O$ | 75 | 40 | 0.20 | 0.21 | 0.10 | 4 |
| 9 | $Ni(NO_3)3 \cdot 6H_2O$ | 75 | 40 | 0.30 | 0.27 | 0.10 | 3 |
| 10 | $Au(OH)_3$ | 75 | 40 | 0.30 | 0.35 | 0.10 | 3 |
| 11 | $GeCl_4$ | 75 | 40 | 0.20 | 0.25 | 0.10 | 5 |
| 12 | $Zr(NO_3)_4$ | 75 | 48 | 0.26 | 0.31 | 0.10 | 3 |

The synthesized zeolites all contained less than 0.06% Al and more than 0.4% Na. The final platinum-containing catalysts contained 0.57–0.80% Pt.

Example 19

The apparent "alpha activity" of the non-acidic platinum containing zeolites was measured using the standard alpha apparatus in either helium or hydrogen over a period of 1–3 hours. The relative hexane conversion activities of the various Pt/ZSM-5 catalysts are shown in Table 2 below:

TABLE 2

| Relative Hexane Conversion Activities for Various Pt/ZSM-5 Catalysts | | | |
|---|---|---|---|
| Catalyst | % Pt | % M | Activity[a] |
| hi Si | 0.6 | — | 746 |
| Sn | 1.5 | 2.7 | 1013 |
| In | 0.9 | 2.5 | 320 |
| Tl | 0.7 | 4.5 | 94 |
| Pb | 1.4 | 4.5 | 193 |
| Cr | 0.6 | 0.3 | 605 |
| Ti | 0.8 | 1.0 | 865 |
| Sc | 0.6 | 0.9 | 169 |
| Au | 0.7 | 3.9 | 763 |
| Ni | 0.8 | 1.5 | 968 |
| Ge | 0.9 | 0.4 | 691 |
| Zr | 0.6 | 3.1 | 398 |

[a]"Apparent alpha" at 538° C. in He after 1 hour on stream.

The bimetallic catalysts, non-acidic bimetallic Pt/ZSM-5 containing the modifiers: indium, tin, thallium, or lead, exhibited dramatically enhanced toluene selectivities approaching 95% or better (on a mole basis).

What is claimed is:

1. A catalytic dewaxing process comprising
contacting a waxy feed, containing $C_{15}°$ paraffins, under dewaxing conditions, with a non-acidic catalyst comprising a dehydrogenation metal and a non-acidic crystalline microporous modifier containing material wherein the modifier is selected from the group consisting of tin, thallium, and lead;
converting said $C_{15}+$ paraffins to distillate range boiling products; and
producing a product having a pour point which is less than that of the feed.

2. The process of claim 1, wherein said dewaxing conditions include a temperature ranging from about 500° to 1200° F.; a pressure ranging from 0 to 1000 psig; a weight hourly space velocity of 0.1 to 20; and $H_2$:feed ratio of 0 to 20:1.

3. The process of claim 1, wherein said non-acidic microporous crystalline tin-, thallium- or lead-containing material include 0.05 to 20 weight percent tin, thallium or lead and wherein the dehydrogenation metal comprises 0.01 to 30 weight percent of the catalyst composition.

4. The process of claim 1, wherein said non-acidic crystalline microporous material exhibits the X-ray diffraction pattern of a zeolite.

5. The process of claim 1, wherein said non-acidic crystalline microprous tin- thallium-, or lead-containing material contains cations selected from the group consisting of Periodic Table Group IA and IIA cations.

6. The process of claim 1, wherein prior to said contacting said feed is subjected to conventional hydrotreating conditions to remove therefrom any one of the elements selected from the group consisting of sulfur, nitrogen and oxygen, said elements present as hydrocarbon derivatives of components of the feed.

7. The process of claim 1, wherein the dehydrogenation metal is a platinum group metal.

8. The process of claim 1, wherein the dehydrogenation metal is platinum.

9. The process of claim 4, wherein the dehydrogenation metal is platinum.

10. The process of claim 4, wherein the zeolite in its acid form exhibits a constraint index of 1 to 12.

11. The process of claim 4, wherein the zeolite is ZSM-5, ZSM-11, ZSM-22, ZSM-23, ZSM-35, ZSM-48 or ZSM-50.

12. The process of claim 4, wherein the zeolite is ZSM-5.

13. A process for dewaxing a waxy feed containing $C_{15}+$ paraffins comprising
subjecting said feed to catalytic hydrotreating conditions, and then contacting said hydrotreated waxy feed containing $C_{15}+$ paraffins under dewaxing conditions with a non-acidic catalyst comprising a dehydrogenation metal and a non-acidic crystalline microporous modifier containing material, wherein the modifier is selected from the group consisting of tin, thallium, and lead;
converting said $C_{15}+$ paraffins to distillate range boiling products; and
producing a product having a pour point which is less than that of the feed.

14. The process of claim 13, wherein said feed is hydrotreated; wherein said hydrotreating conditions include a temperature of 550° F. to 850° F.; an overall space velocity of 0.2 to about 2 in the presence of hydrogen wherein the amount of hydrogen ranges from 1000 to 10,000 standard cubic feet per barrel of feed.

15. A catalytic dewaxing process comprising
contacting a waxy feed, containing $C_{15}+$ paraffins, under dewaxing conditions, with a non-acidic catalyst comprising a dehydrogenation metal and a non-acidic crystalline microporous tin-containing material;

converting said $C_{15}+$ paraffins to distillate range boiling products; and producing a product having a pour point which is less than that of the feed.

16. The process of claim 15, wherein said dewaxing conditions include a temperature ranging from about 500° to 1200° F.; a pressure ranging from 0 to 1000 psig; a weight hourly space velocity of 0.1 to 20; and $H_2$:feed ratio of 0 to 20:1.

17. The process of claim 15, wherein said non-acid microporous crystalline tin-containing material include 0.05 to 20 weight percent tin and wherein the dehydrogenation metal comprises 0.01 to 30 weight percent of the catalyst composition.

18. The process of claim 15, wherein said non-acidic crystalline microporous tin-containing material exhibits the X-ray diffraction pattern of a zeolite.

19. The process of claim 15, wherein said non-acidic crystalline microporous tin-containing material contains cations selected from the group consisting of Periodic Table Group IA and IIA cations.

20. The process of claim 13, wherein prior to said contacting said feed is subjected to conventional hydrotreating conditions to remove therefrom any one of the elements selected from the group consisting of sulfur, nitrogen and oxygen, said elements present as hydrocarbon derivatives of components of the feed.

21. The process of claim 15, wherein the dehydrogenation metal is a platinum group metal.

22. The process of claim 15, wherein the dehydrogention metal is platinum.

23. The process of claim 17, wherein the dehydrogenation metal is platinum.

24. The process of claim 15, wherein the microporous crystalline material is isostructural with a zeolite which zeolite in its acid form exhibits a constraint index of 1 to 12.

25. The process of claim 18, wherein the zeolite is ZSM-5, ZSM-11, ZSM-22, ZSM-23, ZSM-35, ZSM-48 or ZSM-50.

26. The process of claim 18, wherein the zeolite is ZSM-5.

27. A process for dewaxing a waxy feed containing $C_{15}+$ paraffins comprising subjecting said feed to catalytic hydrotreating conditions, and then contacting said hydrotreated waxy feed containing $C_{15}+$ paraffins under dewaxing condition with a non-acidic catalyst comprising a dehydrogenation metal and a non-acidic crystalline microporous tin-containing material;

converting said $C_{15}+$ paraffins to distillate range boiling products; and producing a product having a pour point which is less than that of the feed.

28. The process of claim 27, wherein said hydrotreating conditions include a temperature of 550° F. to 850° F.; an overall space velocity of 0.2 to about 2 in the presence of hydrogen wherein the amount of hydrogen ranges from 1000 to 10,000 standard cubic feet per barrel of feed.

29. A lube range product produced by the process of claim 27.

* * * * *

UNITED STATES PATENT AND TRADEMARK OFFICE
CERTIFICATE OF CORRECTION

PATENT NO. : 4,892,645

DATED : January 9, 1990

INVENTOR(S) : Ralph M. Dessau

It is certified that error appears in the above-identified patent and that said Letters Patent is hereby corrected as shown below:

Col. 6, Line 58   change "hydrogen" to -- hydrogel --

Col. 7, Line 60   change "750" to -- 150 --
                  change "0.20" to -- 0.10 --

Col. 9, Line 14   add -- (all synthesis used SPEX silica, temp = 160°C), stirred Signed and Sealed this Sixteenth Day of July, 1991

Attest:

HARRY F. MANBECK, JR.

*Attesting Officer*   Commissioner of Patents and Trademarks